(12) United States Patent
Soklaski

(10) Patent No.: US 9,918,885 B2
(45) Date of Patent: Mar. 20, 2018

(54) REMOTE CONTROL FOR SCOOTER LIFT

(71) Applicant: Tyrone Soklaski, West Palm Beach, FL (US)

(72) Inventor: Tyrone Soklaski, West Palm Beach, FL (US)

(*) Notice: Subject to any disclaimer, the term of this patent is extended or adjusted under 35 U.S.C. 154(b) by 0 days.

(21) Appl. No.: 15/184,920

(22) Filed: Jun. 16, 2016

(65) Prior Publication Data
US 2016/0296391 A1 Oct. 13, 2016

Related U.S. Application Data

(63) Continuation-in-part of application No. 14/477,854, filed on Sep. 4, 2014, now Pat. No. 9,403,473.

(60) Provisional application No. 61/873,831, filed on Sep. 4, 2013.

(51) Int. Cl.
A61G 3/06 (2006.01)
A61G 3/02 (2006.01)
B60P 3/12 (2006.01)
B60P 1/44 (2006.01)

(52) U.S. Cl.
CPC ........... *A61G 3/062* (2013.01); *A61G 3/0209* (2013.01); *B60P 1/4421* (2013.01); *B60P 3/122* (2013.01); *A61G 2203/12* (2013.01)

(58) Field of Classification Search
CPC .. A61G 3/062; A61G 2220/16; A61G 3/0808; Y10S 414/134; B60P 1/4442; B66F 3/46; B66F 7/10
See application file for complete search history.

(56) References Cited

U.S. PATENT DOCUMENTS

| 5,149,246 A * | 9/1992 | Dorn ........................ A61G 3/02 414/541 |
| 5,674,043 A * | 10/1997 | Dorn ........................ A61G 3/06 187/222 |
| 7,784,587 B2 * | 8/2010 | Zablocky ................. A61G 3/06 187/223 |
| 8,500,383 B2 * | 8/2013 | Schmidgall ............... B60P 7/12 410/30 |
| 2007/0059135 A1 * | 3/2007 | Mizner ................. B60P 1/4442 414/462 |
| 2011/0002764 A1 * | 1/2011 | Darnell ................ A61G 3/0808 414/550 |
| 2011/0066278 A1 * | 3/2011 | Pinault ................. A61N 5/1049 700/213 |
| 2013/0181418 A1 * | 7/2013 | Burton ...................... B62B 1/12 280/47.19 |
| 2013/0240300 A1 * | 9/2013 | Fagan ....................... B66F 3/46 187/210 |
| 2015/0008063 A1 * | 1/2015 | Walter ................ B60K 28/063 180/272 |

* cited by examiner

*Primary Examiner* — Gregory W Adams
(74) *Attorney, Agent, or Firm* — Allen F. Bennett; Bennett Intellectual Property

(57) ABSTRACT

A scooter lift having a wireless remote control that only signals the lift to raise or lower a platform when the remote control is positioned behind the automobile. The remote control only transmit signals if it has a clear line of sight with a transmitter eye located on the back of the control box for the scooter lift. An accelerometer prevents lowering of the platform when it detects motion.

8 Claims, 3 Drawing Sheets

REMOTE CONTROL FOR SCOOTER LIFT

CROSS-REFERENCE TO RELATED APPLICATIONS

This application is a continuation-in-part of U.S. patent application Ser. No. 14/477,854 filed on Sep. 4, 2014 and claims priority to U.S. Provisional Application Ser. No. 61/873,831 filed Sep. 4, 2013.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

FIELD

The present invention relates to remote control of wheelchair or scooter lift devices attached to the back of an automobile for transporting wheelchairs and similar devices. More particularly, the invention provides a remote control for lift devices on the back of an automobile having safety features for preventing unintended or accidental actuation of a lift device.

BACKGROUND

Electronically operated hitch mounted wheelchair lifts have been available for a number of years and permit the user of a scooter, wheelchair or other mobility device to be mechanically lifted entered to an automobile or transportation.

A common problem associated with the use of hitch-mounted wheelchair lifts is the limited motility of persons commonly using such devices. The controls for raising and lowering a lift are often positioned on a control box located at the top of the elevator. This position may be difficult to access for someone of limited motility.

A popular solution is to provide a remote control that allows an operator of the lift device to raise and lower the lift simply by the pressing buttons on a handheld remote control. These remote controls are usually connected to the control box by a coiled wire and may be placed in a holster on or near the control box.

Wireless remote controls have so far not been applied for lift devices. One common reason is that remote controls generally operate on a finite number of frequencies. As a result, a remote control in use by one operator may inadvertently actuate a lift on another person's vehicle. A similar problem exists with garage door openers. However, savvy garage door openers have learned to program a specific frequency to avoid a garage door from opening using another person's remote control.

Another difficulty in using a remote control to actuate a scooter lift is the danger of accidentally actuating the lift while an automobile is in motion driving down a road. If a scooter lift lowers while a car is driving, it can cause substantial damage to the lift, a scooter or wheelchair attached to the lift, the automobile and automobiles sharing the roadway. Because of these difficulties, remote controls connected to a control box by a wire are considered the most practical option. However, this still results in difficulty because an operator must obtain the remote control which is generally stored in a location that is difficult to reach.

In view of the foregoing, there is a need to provide a proximity sensor that may be used in conjunction with a rear-mounted wheelchair lift for an automobile. Furthermore, it is desirable to provide a proximity sensor that may be used in conjunction with a rear-mounted wheelchair lift for an automobile that is effective for all the configurations of the wheelchair lift.

SUMMARY

Accordingly, the primary object of the present invention is to provide a scooter lift having a wireless remote control and safeguards to prevent damage to the lift or other objects.

In one embodiment, the scooter lift is mounted on the rear of an automobile having a transmitter eye and an accelerometer integrated into a control box. The accelerometer prevents lowering of the scooter lift when the accelerometer detects motion. An audio alert is emitted if a person attempts to drive the automobile while the lift is in the lowered position. The transmitter eye is only capable of sending and/or receiving signals from a remote control when there is a clear line of sight between the transmitter eye and a transmitter on the remote control.

In another embodiment, the control box of the lift also includes a camera that sends a video signal to the remote control which is then displayed on the remote controls viewscreen. The video signal does not require a line of sight between the remote control and a transmitter connected to the camera.

In another embodiment, an ancillary circuit board is attached to a control box of an existing scooter lift. The ancillary circuit board is connected to the same leads normally connected to a switch. The ancillary circuit board includes an accelerometer and a transmitter eye. When the accelerometer detects motion it automatically raises the platform if it was in the lowered position. A remote control wirelessly communicates with the transmitter eye and instructs the lift to raise and lower the platform. The ancillary circuit board may also include a camera in communication with a transmitter that sends a video signal to the remote control in a manner that does not require a line of sight between the transmitter and the remote control. A viewscreen on the remote control displays the video streamed from the camera.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated.

There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
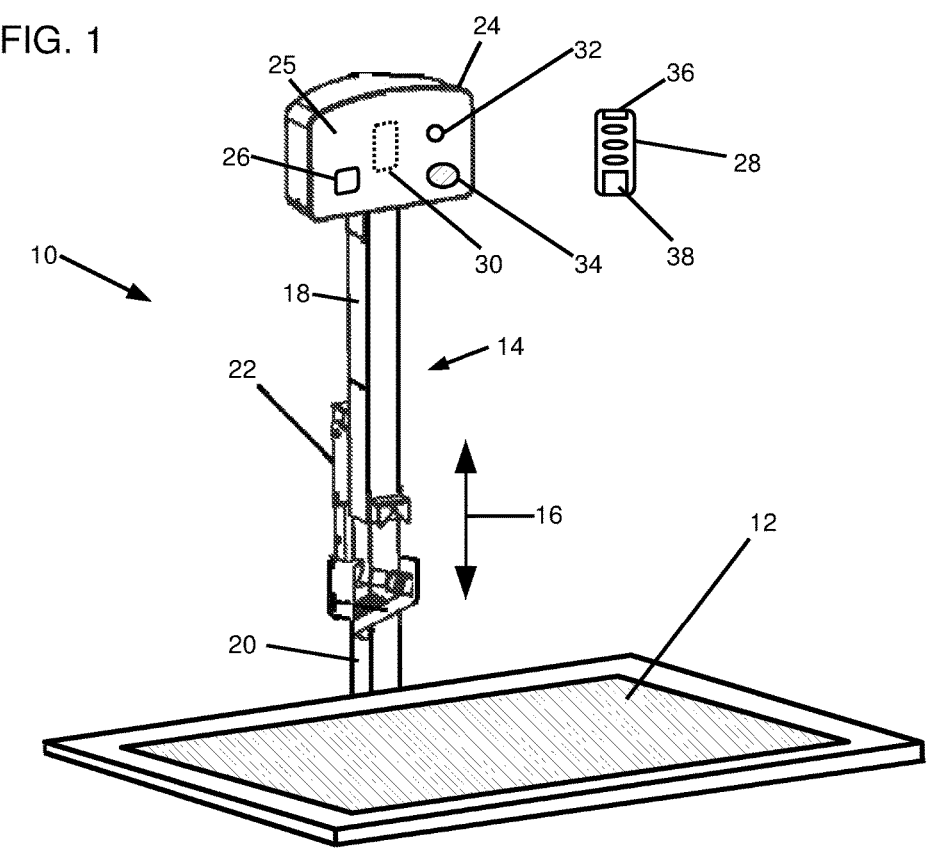
FIG. 1 is a perspective view of a scooter lift in accordance with the principles of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As used herein, directional terms have their meanings as commonly used in relation to an automobile. Thus "down" generally refers to a direction toward the ground, "up" generally refers to a direction away from the ground, "front" and "forward" generally refer to a direction toward the front of the car and "back," "rear" and "backward" generally refer to a direction behind the automobile.

FIG. 1 shows a scooter lift 10 in accordance with the principles of the invention. The scooter lift 10 includes a platform 12 attached to an elevator 14 and may be raised and lowered as shown by vertical arrow 16. The elevator 14 includes two components, and upper sleeve 18 and a lower rod 20 that telescopes in an out of the upper sleeve 18, thereby allowing raising and lowering of the platform 12, thereby allowing the platform 12 to translate between a raised position for travel and a lowered position for loading and unloading a scooter, wheelchair or other device. A vehicle mount 22 allows the scooter lift 10 to be attached to a hitch or other device on the back of an automobile. A control box 24 is located at the top of the elevator 14.

In this embodiment, the control box 24 includes a transmitter eye 26 on the rear face 25 of the control box 24. The transmitter eye 26 allows the control box 24 to send and receive transmissions to and from a remote control 28. As used herein, a transmitter "eye" has the meaning as commonly used by a skilled artisan and refers to a device capable of receiving, and optionally emitting, electromagnetic signals to a remote control or other device. The remote control 28 includes a similar transmitter 36 that allows it to send and/or receive signals from the transmitter on a 26. This allows an operator to instruct the lift 10 to raise or lower the platform 12 using the remote control 28. The transmitter eye 26 on the control box 24 is only capable of sending and receiving signals to and from the transmitter 36 on the remote control 28 along a linear path. That is, the remote control 28 must have a clear "line of sight" to the transmitter eye 26 in order to send or receive signals. Because the transmitter eye 26 is located on the rear face 25 of the control box 24, the remote control 28 can only be used to lower or raise the platform 12 when it is positioned behind the lift 10. As a result, a person within the automobile cannot actuate the lift 10 to lower the platform 12 while the remote control is inside the automobile or vehicle. This prevents accidental lowering of the lift platform 12 while an automobile was driving down the road.

The control box 24 of this embodiment also includes an accelerometer 30 that determines whether the lift 10 is stationary or in motion. The accelerometer 30 ask as a specialized governor that prevents the platform 12 from being lowered while the lift is in motion. Thus, the lift cannot be lowered while an automobile is being driven. The accelerometer may optionally automatically raise the platform 12 if the lift 10 begins moving while the platform 12 is in the lowered position. This may minimize any damage caused by accidentally driving away while the lift is still in a lowered position. Optionally, the accelerometer may sound an audio alarm 34 on the control box 24 if it detects motion while the platform 12 is in the lowered position.

This embodiment also includes an optional camera 32 that may be connected to a monitor screen, not shown, so that an operator of an automobile may see what is behind the automobile. A monitor screen may be connected to the camera 32 wirelessly or by means of wires connected directly to a monitor. Optionally, the remote control 28 may include a viewscreen 38 in wireless connection with the camera 32. The remote control 28 may have a size substantially similar to the size of a common mobile or cellular phone. The remote control may be placed in a cell phone mounts commonly used on automobile dashboards, thereby providing a monitor easily viewed by a driver. The camera 32 transmits a signal to the remote control 28 wirelessly in a manner that does not require a direct line of sight, thus allowing the monitor 38 to function when it is positioned in front of the lift 10.

Optionally, the transmitter eye 26 may send and receive line of sight signals using a frequency compatible with wireless transmissions commonly used with cellular phones. Similarly, the camera 32 may send transmissions also compatible with cellular phones. As a result, the lift 10 may be controlled by a cellular phone having a software application installed allowing it to function as a remote. Those skilled in the art will appreciate that such functionality has already been used to allow a cellular phone to operate as a remote control for televisions and other devices.

Figure 2:
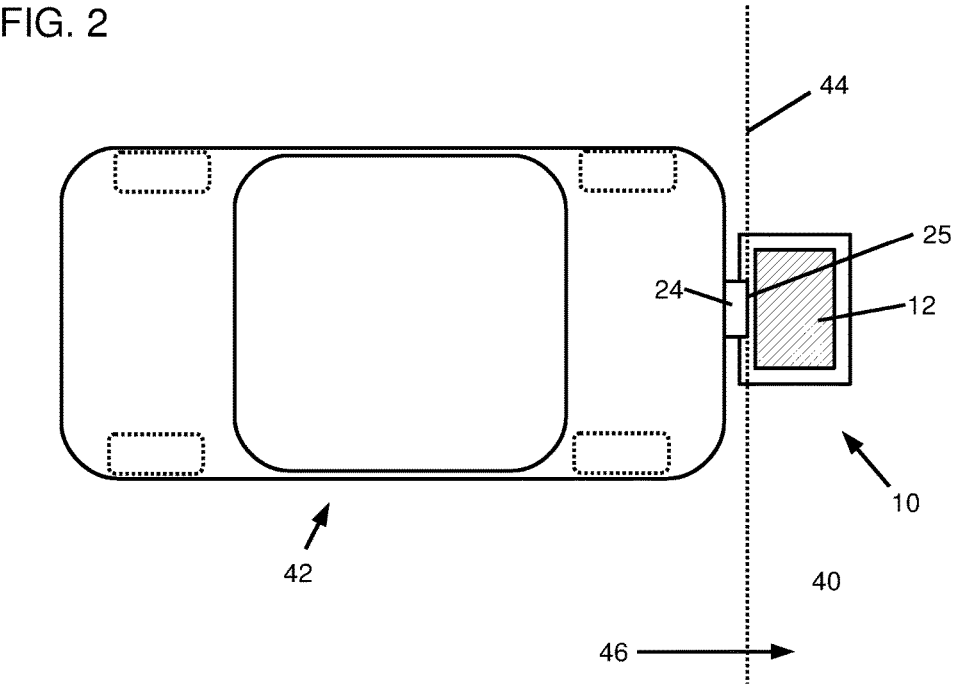
FIG. 2 is a top plan view of a scooter lift in accordance with the principles of the invention to an automobile.

FIG. 2 shows the scooter lift 10 attached to the back 40 of an automobile 42. A broken line 44 depicts a plane parallel to the back face 25 of the control box 24. The broken line 44 defines an area 46 behind the automobile 42 in which the remote control 28 is capable of transmitting and receiving signals from the transmitter eye 26. When the remote control 28 is in front of the plane depicted by broken line 44, it is incapable of sending a signal to lower the platform 12.

Figure 3:
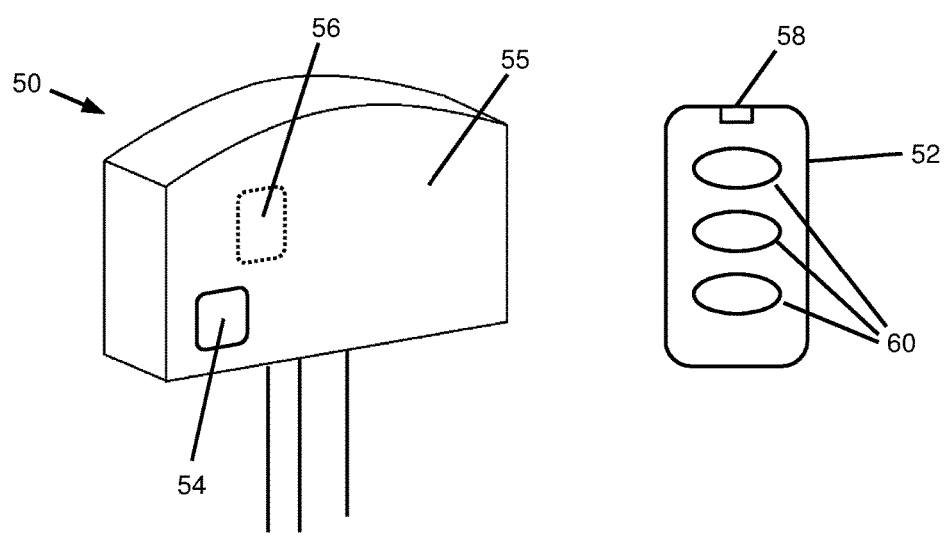
FIG. 3 is a perspective view of a control box and a remote control in accordance with the principles of the invention.

FIG. 3 shows an alternative embodiment of a control box 50 and a remote control 52 in accordance with the principles of the invention. In this embodiment, the control box 50 has a back face 55 and includes only a transmitter eye 54 and an accelerometer 56. The remote control 52 includes a transmitter 58 and various buttons 60 for controlling a lift, but does not include a viewscreen monitor. The remote control 52 only communicates with the transmitter eye 54 when it has a direct line of sight to the back face 55.

Figure 4:
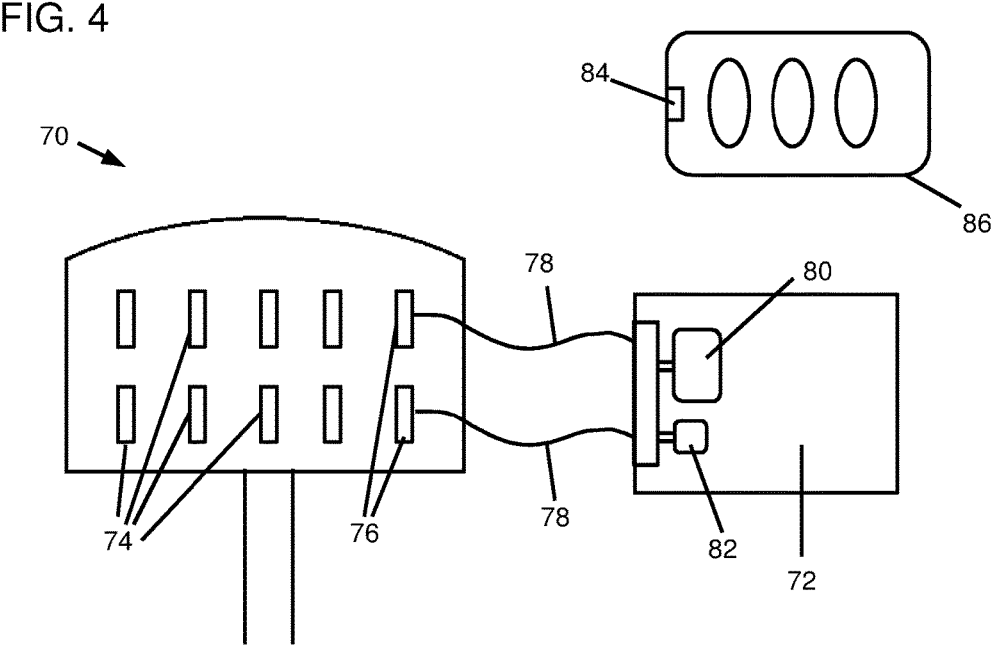
FIG. 4 is a rear plan view of a control box connected to an ancillary circuit board that is in wireless communication with a remote control in accordance with the principles of the invention.

FIG. 4 shows a control box 70 typical of the prior art having an ancillary circuit board 72 connected to it in order to modify a prior art control box such that it functions in accordance with the principles of the invention. The control box 70 has had its back face, not shown, removed. The interior of the control box 70 includes several leads 74 allowing connection to the electronics of an automobile, the electronics of a lift and to switches for actuating the lift to move up and down. Leads 76 are typically in electrical communication with a switch on the exterior of the control box 70. The ancillary circuit board 72 is connected to these leads 76 by means of wires 78. The circuit board 72 includes an accelerometer 80 and a transmitter eye 82. When the ancillary circuit board 72 has been connected to the leads 76 by wires 78, it sends the same signals normally sent by an actuating switch on the control box 70. The transmitter 84 on the wireless remote control 86 sends and/or receives signals from the transmitter eye 82 to raise and lower the platform in place of a typical switch. In this embodiment, the accelerometer 80 of the ancillary circuit board 72 prevents the lift platform from lowering when the accelerometer 80 detects motion.

Figure 5:
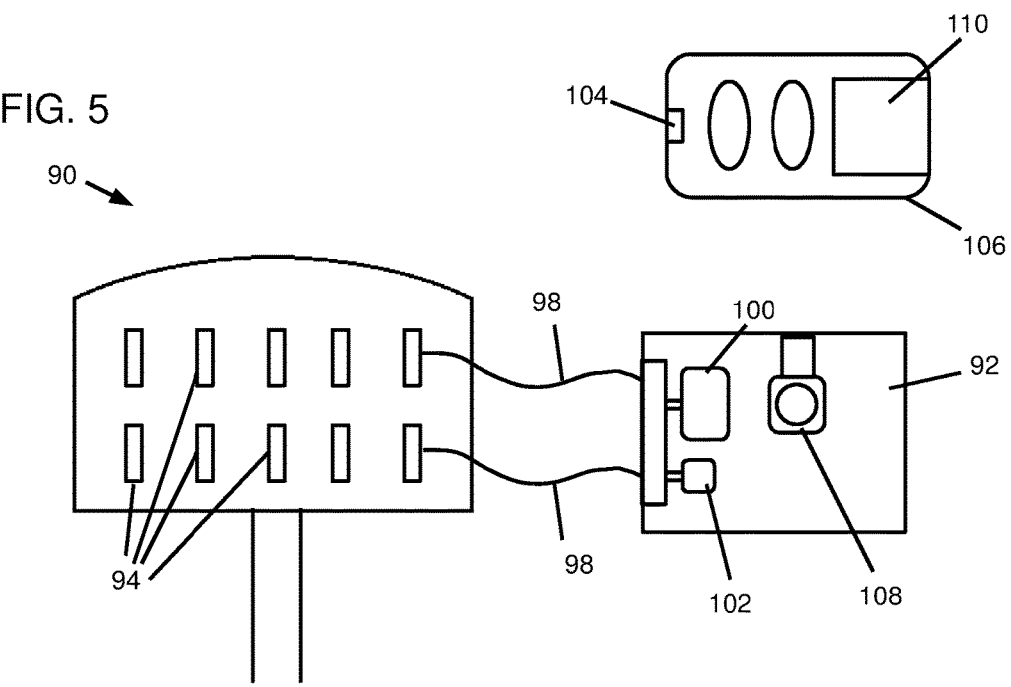
FIG. 5 is a rear plan view of an alternative embodiment of a control box connected to an ancillary circuit board that is in wireless communication with a remote control in accordance with the principles of the invention.

FIG. 5 shows an alternative embodiment of a control box 90 typical of the prior art having an ancillary circuit board 92 connected to it in order to modify a prior art control box such that it functions in accordance with the principles of the invention. The control box 90 includes several leads 94 allowing connection to the electronics of an automobile, the electronics of a lift, and to a switch for controlling translation of a platform between a raised position and a lowered position. Leads 96 are normally in electrical communication with the switch. The ancillary circuit board 92 is connected to these leads 96 by means of wires 98. The circuit board 92 includes an accelerometer 100 and a transmitter eye 102. When the ancillary circuit board 92 is connected to leads 96, it sends the same signals normally sent by an actuating switch on the control box 90. The transmitter 104 on the remote control 106 sends and/or receives signals from the transmitter eye 102. To raise and lower the platform in place of the typical switch. The accelerator 100 prevents the platform from lowering when it detects motion. In this embodiment, the ancillary circuit board 92 also includes a camera 108 that sends a video signal to the remote control 106 which may be displayed on the viewscreen 110. A transmitter 112 sends the video signal from the camera 108 to the remote control in a manner that does not require a line of sight between the remote control 106 and the transmitter 112.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A wheelchair lift comprising:
   a vehicle mount;
   a platform attached to an elevator, the platform translating between a raised position and a lowered position when actuated by the elevator;
   a control box at the top of the elevator having a rear face;
   an accelerometer in the control box that prevents the platform from translating into the lowered position when the wheelchair lift is in motion and automatically instructs the elevator to translate the platform to the raised position when it detects motion while the platform is in the lowered position;
   a remote control having a remote transmitter capable of sending a signal along a linear path;
   a first transmitter on the rear face of the control box capable of receiving a signal only along a linear path from the remote control when it is located behind the control box; and,
   wherein the signal sent by the remote control comprises an instruction to translate the platform.

2. The wheelchair lift of claim 1 further comprising:
   a video camera on the control box;
   a second transmitter sending a video signal to the remote control in any direction; and,
   a remote viewscreen displaying the video signal from the camera.

3. The wheelchair lift of claim 2 wherein the remote viewscreen is on the remote control.

4. The wheelchair lift of claim 2 wherein the first transmitter, the second transmitter, the video camera and the accelerometer are located on an auxiliary circuit board affixed to a pre-existing control box having a manually activated switch for raising and lowering the platform.

5. The wheelchair left of claim 1 wherein the accelerometer generates an alert signal when it detects motion while the platform is in the lowered position.

6. The wheelchair lift of claim 1 wherein the remote control is a smart phone.

7. A wheelchair lift comprising:
   a vehicle mount;
   a platform attached to an elevator, the platform translating between a raised position and a lowered position when actuated by the elevator;
   a control box at the top of the elevator having a rear face;
   a remote control having a remote transmitter capable of sending a signal along a linear path;
   a first transmitter on the rear face of the control box capable of receiving a signal only along a linear path from the remote control when it is located behind the control box;
   a video camera on the control box;
   a second transmitter sending a video signal to the remote control in any direction; and,
   a remote viewscreen displaying the video signal from the camera;
   an accelerometer in the control box that prevents the platform from translating into the lowered position when the wheelchair lift is in motion, generates an alert signal when it detects motion while the platform is in the lowered position, and automatically instructs the elevator to translate the platform to the raised position and it detects motion while the platform is in the lowered position;

wherein the remote viewscreen is on the remote control; and, wherein the signal sent by the remote control comprises an instruction to translate the platform.

8. The wheelchair lift of claim 7 wherein the remote control is a smart phone.

* * * * *